United States Patent Office 3,395,149
Patented July 30, 1968

3,395,149
1 - ALKENYL - 3 - ALKYL - 5 - (1 - CYANOAL-KYLAMINO)/(1 - CYANOARALKYL - AMINO) - 6 - AMINO - 1,2,3,4 - TETRAHYDRO-2,4-PYRIMIDINEDIONES
Elmer F. Schroeder, Chicago, Ill., assignor to G. D. Searle & Co., Chicago, Ill., a corporation of Delaware
No Drawing. Filed May 26, 1966, Ser. No. 553,028
10 Claims. (Cl. 260—256.4)

The present invention is concerned with novel heterocyclic chemical compounds characterized by a cyanoalkylamino or cyanoaralkylamino function and especially with 1 - alkenyl - 3 - alkyl - 5 - (1 - cyanoalkylamino)/(1 - cyanoaralkylamino) - 6 - amino - 1,2,3,4 - tetrahydro-2,4-pyrimidinediones which are represented by the following structural formula

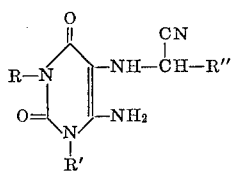

wherein R is a lower alkyl radical, R' is a lower alkenyl radical and R" is a radical of the formula (lower alkylene)-X X being hydrogen or phenyl.

The lower alkylene radicals depicted above are typified by methylene, ethylene, trimethylene, tetramethylene, pentamethylene, hexamethylene, heptamethylene and the branched-chain isomers thereof.

Examples of the lower alkyl radicals symbolized by R in the foregoing structural representation are methyl, ethyl, propyl, butyl, pentyl, hexyl, heptyl and the branched-chain radicals isomeric therewith.

Illustrative of the lower alkenyl radicals represented by R' are vinyl, allyl, propenyl, methallyl, butenyl, pentenyl, hexenyl, heptenyl, together with the corresponding branched-chain groups.

The compounds of this invention exhibit valuable pharmacological properties. They are diuretic agents, for example, as is evidenced by their ability to promote renal excretion of water and sodium. They are, furthermore, inhibitors of desoxycorticosterone acetate in view of their ability to reverse the salt retaining effect of that substance. In addition, they display anti-inflammatory, pepsin inhibitory and anti-ulcerogenic activity. These compounds are also anti-bacterial, anti-protozoal and anti-algal agents in consequence of their ability to inhibit the growth of such organisms as *Escherichia coli, Diplococcus pneumoniae, Tetrahymena gelleii* and *Chlorella vulgaris.* They inhibit also the germination of dicotyledenous seeds.

The instant compounds are useful also as intermediates in the manufacture of other pharmacologically useful agents. When these compounds are contacted with an alkaline reagent, cyclization occurs to afford the corresponding 1 - alkenyl - 3 - alkyl - 7 - amino - 1,2,3,4,5,6 - hexahydro-2,4-pteridinediones. Oxidation of the latter substances results in the corresponding 1-alkenyl-3-alkyl-7-amino-1,2,3,4-tetrahydro-2,4-pteridinediones. Those processes are specifically exemplified by the reaction of 1-allyl-3 - ethyl - 5 - cyanomethylamino - 6 - amino - 1,2,3,4-tetrahydro-2,4-pyrimidinedione with sodium methoxide in methanol to yield 1-allyl-3-ethyl-7-amino-1,2,3,4,5,6-hexahydro-2,4-pteridinedione and the reaction of the latter substance with hydrogen peroxide and ferrous chloride to afford 1-allyl-3-ethyl-7-amino-1,2,3,4-tetrahydro-2,4-pteridinedione. The foregoing 2,4-pteridinediones exhibit diuretic, anti-inflammatory, anti-ulcerogenic, pepsin inhibitory, analgesic and anti-biotic properties.

The compounds of the present invention are conveniently manufactured by utilizing as starting materials the 1 - alkenyl - 3 - alkyl - 5,6 - diamino - 1,2,3,4 - tetrahydro-2,4-pyrimidinediones of the following structural formula

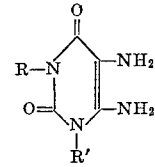

wherein R and R' are as hereinbefore defined. Those materials are contacted with an aliphatic or araliphatic aldehyde in the presence of hydrogen cyanide or a source thereof to afford the instant compounds. An aqueous methanolic solution containing 1-allyl-3-ethyl-5,6-diamino-1,2,3,4-tetrahydro-2,4-pyrimidinedione, sodium cyanide and acetic acid is thus contacted with phenylacetaldehyde to produce 1-allyl-3-ethyl-5-(1-cyanophenethylamino)-6-amino-1,2,3,4-tetrahydro-2,4-pyrimidinedione. In place of acetic acid, other acids such as hydrochloric, sulfuric or phosphoric may be used to generate hydrogen cyanide in the reaction mixture. Other polar water miscible organic solvents may be used in place of ethanol. The lower alkanols are particularly suitable.

Equivalent to the instant amines for the purposes of this invention are the corresponding nontoxic acid and quaternary salts exemplified by the citrate, tartrate, maleate, ascorbate, gluconate, lactate, succinate, phosphate, sulfate, hydrobromide, hydrochloride, methiodide, ethiodide, methochloride, methobromide, methosulfate, ethosulfate, etc.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.) and quantities of materials in parts by weight except where otherwise noted.

EXAMPLE 1

To a mixture of 4.2 parts of 1 - allyl - 3-ethyl-5,6-diamino - 1,2,3,4 - tetrahydro - 2,4 - pyrimidinedione, 8 parts of methanol and 2.1 parts of glacial acetic acid is added, at 0–5°, a solution of 1.08 parts of sodium cyanide in 5 parts of water. That reaction mixture is warmed to about 40°, and 1.7 parts of 37% aqueous formaldehyde is added. The resulting homogeneous mixture is kept at 40–45° for about 45 minutes, then is diluted with water and cooled. The crystals which separate are collected by filtration, washed on the filter with water and dried to afford the crude product. Purification of that material by recrystallization from ethyl acetate yields pure 1 - allyl - 3 - ethyl - 5 - cyanomethylamino-6 - amino - 1,2,3,4 - tetrahydro - 2,4 - pyrimidinedione as colorless needle-like crystals, melting at about 151–153°. This compound is represented by the following structural formula

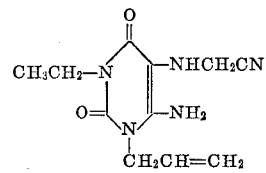

EXAMPLE 2

When an equivalent quantity of 1 - methallyl - 3-methyl - 5,6 - diamino - 1,2,3,4 - tetrahydro - 2,4 - pyrimidinedione is substituted in the procedure of Example 1, there is produced 1 - methallyl - 3 - methyl - 5 - cyanomethylamino - 6 - amino - 1,2,3,4 - tetrahydro - 2,4-pyrimidinedione.

EXAMPLE 3

To a mixture of 4.2 parts of 1 - allyl - 3 - ethyl - 5,6-diamino - 1,2,3,4 - tetrahydro - 2,4 - pyrimidinedione, 8 parts of methanol and 3.15 parts of glacial acetic acid is added, at 0–5° over a period of about 2 minutes, a solution of 2 parts of sodium cyanide in 8 parts of water. That mixture is allowed to warm to about 25°, following which time a solution of 1.22 parts of propionaldehyde in 2.4 parts of methanol containing 3 parts of water is added. Stirring at about 25° is continued for approximately 15 minutes; then 5 parts of water is added and the mixture is heated at approximately 40° for about 30 minutes. The majority of the organic solvent is then removed by distillation, and the residual mixture is diluted with water. A solid forms rapidly and is collected by filtration, washed on the filter with water and dried to yield the crude product. Recrystallization of that material from aqueous ethanol yields pure 1 - allyl - 3 - ethyl - 5 - (1 - cyanopropylamino) - 6 - amino - 1,2,3,4-tetrahydro - 2,4 - pyrimidinedione, melting at about 111–113°. This compound is represented by the following structural formula

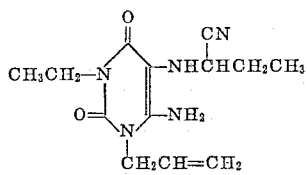

EXAMPLE 4

To a mixture containing 8.4 parts of 1 - allyl - 3 - ethyl - 5,6 - diamino - 1,2,3,4 - tetrahydro - 2,4 - pyrimidinedione, 16 part of methanol and 6.3 parts of glacial acetic acid is added gradually, at 0–5° with stirring, a solution of 4 parts of sodium cyanide in 16 parts of water. The ice bath is removed, and the mixture is allowed to warm to approximately 25°, at which time a solution of 3.04 parts of butyraldehyde in 4.8 parts of methanol containing 5 parts of water is added. The resulting reaction mixture becomes homogeneous, but after a few minutes the crystalline product begins to separate. The mixture is kept at room temperature for approximately 30 minutes longer, then is diluted with water and cooled to 0–5° by means of an ice bath. The crystalline product is then isolated by filtration, washed on the filter with water and dried. Recrystallization of that crude product from ethyl acetate-hexane yields pure 1 - allyl - 3 - ethyl - 5 - (1 - cyanobutylamino) - 6-amino - 1,2,3,4 - tetrahydro - 2,4 - pyrimidinedione as a colorless solid, melting at about 90–92°. It is characterized further by the following structural formula

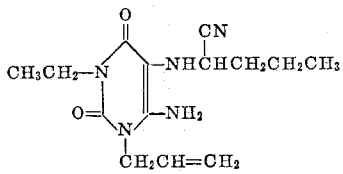

EXAMPLE 5

A mixture containing 16.8 parts of 1 - allyl - 3 - ethyl-5,6 - diamino - 1,2,3,4 - tetrahydro - 2,4 - pyrimidinedione, 41.6 parts of methanol and 12.6 parts of glacial acetic acid is cooled to 0–5°, then is stirred while a solution of 8 parts of sodium cyanide in 20 parts of water is added. The temperature is allowed to rise to approximately 25°, at which time a solution of 10 parts of phenylacetaldehyde in 12 parts of ethanol is added. The resulting homogeneous mixture is stirred at room temperature for about 30 minutes, then is diluted with approximately 80 parts of water. The initially oily product solidifies upon standing and is collected by filtration, washed on the filter with water and dried. That crude product is purified by recrystallization from ethyl acetate-hexane to yield pure 1 - allyl - 3 - ethyl - 5 - (1-cyanophenethylamino) - 6 - amino - 1,2,3,4 - tetrahydro-2,4 - pyrimidinedione, melting at about 124–126°. It is represented by the following structural formula

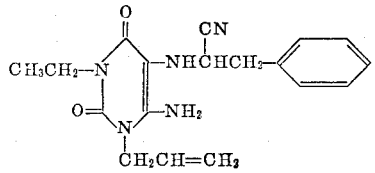

EXAMPLE 6

When equivalent quantities of 1-methallyl-3-methyl-5,6 - diamino-1,2,3,4-tetrahydro-2,4-pyrimidine-dione and 3-phenylpropionaldehyde are substituted in the procedure of Example 5, there is obtained 1-methallyl-3-methyl-5-(1 - cyano-3-phenylpropylamino)-6-amino-1,2,3,4-tetrahydro-2,4-pyrimidinedione.

EXAMPLE 7

A mixture containing 16.8 parts of 1-methallyl-3-methyl-5,6-diamino-1,2,3,4-tetrahydro-2,4-pyrimidinedione, 32 parts of methanol and 12.6 parts of glacial acetic acid is cooled to 0–5°, at which point a solution of 8 parts of sodium cyanide in 32 parts of water is added rapidly. That reaction mixture is allowed to warm to room temperature, and a solution of 4.88 parts of propionaldehyde in 9.6 parts of methanol containing 12 parts of water is added. Stirring at that temperature is continued for about 30 minutes, following which period of time the mixture is diluted with approximately 20 parts of water. After stirring for approximately 2 hours longer, the mixture is further diluted with water, then cooled to 0–5°. The crude solid product which separates is collected by filtration, washed on the filter with water and dried. Purification of that material by recrystallization from ethyl acetate-hexane results in 1-methallyl-3-methyl-5-(1 - cyanopropylamino)-6-amino-1,2,3,4-tetrahydro-2,4-pyrimidinedione as pale yellow crystals, melting at about 124–127°. This compound is represented by the following structural formula

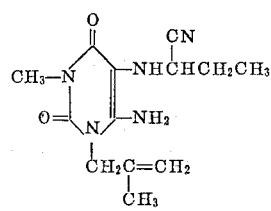

EXAMPLE 8

To a mixture containing 16.8 parts of 1-methallyl-3-methyl-5,6-diamino-1,2,3,4 - tetrahydro-2,4 - pyrimidine- dione, 32 parts of methanol and 12.6 parts of glacial acetic acid is added, at 0–5°, a solution of 8 parts of sodium cyanide in 32 parts of water. After warming to room temperature, a solution of 6.08 parts of butyraldehyde in 9.6 parts of methanol containing 10 parts of water is added. The resulting homogeneous reaction mixture is stirred at that temperature for about 30 minutes, then is diluted with water. The oily product which separates is stirred rapidly in order to promote crystallization. Additional product is precipitated by dilution with water followed by cooling to 0–5°. The resulting solid product is collected by filtration, washed on the filter with water and dried. Purification of that material by recrystallization from ethyl acetate-hexane yields pale yellow crystals of 1-methallyl-3-methyl - 5 - (1-cyanobutylamino)-6-amino-1,2,3,4-tetrahydro-2,4-pyrimidinedione, melting at about 109–111° This compound is represented by the following structural formula

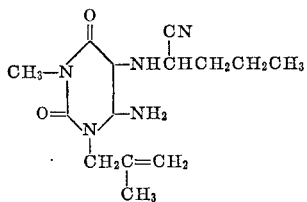

What is claimed is:
1. A compound of the formula

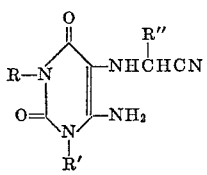

wherein R is a lower alkyl radical, R' is a lower alkenyl radical and R'' is selected from the group consisting of hydrogen and (lower alkylene)—X radicals, X being a member of the class consisting of hydrogen and phenyl.

2. As in claim 1, a compound of the formula

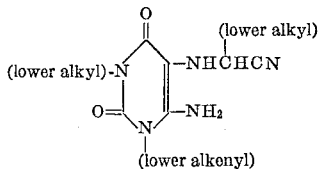

3. As in claim 1, a compound of the formula

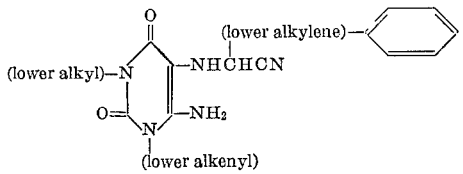

4. As in claim 1, a compound of the formula

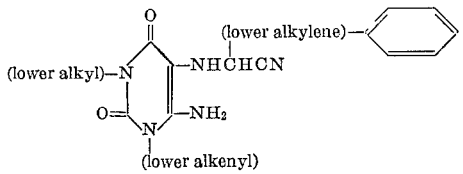

5. As in claim 1, the compound which is 1-allyl-3-ethyl-5-cyanomethylamino-6-amino-1,2,3,4 - tetrahydro-2,4-pyrimidinedione.
6. As in claim 1, the compound which is 1-allyl-3-ethyl-5-(1-cyanopropylamino)-6-amino - 1,2,3,4 - tetrahydro-2,4-pyrimidinedione.
7. As in claim 1, the compound which is 1-allyl-3-ethyl-5-(1-cyanobutylamino)-6-amino-1,2,3,4-tetrahydro - 2,4-pyrimidinedione.
8. As in claim 1, the compound which is 1-allyl-3-ethyl-5-(1-cyanophenethylamino) - 6 - amino-1,2,3,4-tetrahydro-2,4-pyrimidinedione.
9. As in claim 1, the compound which is 1-methallyl-3-methyl-5-(1 - cyanopropylamino)-6-amino-1,2,3,4-tetrahydro-2,4-pyrimidinedione.
10. As in claim 1, the compound which is 1-methallyl-3-methyl-5-(1 - cyanobutylamino)-6-amino-1,2,3,4-tetrahydro-2,4-pyrimidinedione.

References Cited

UNITED STATES PATENTS 3,299,066  1/1967  Papesch _____ 260—256.4

NICHOLAS S. RIZZO, *Primary Examiner.*

R. J. GALLAGHER, *Assistant Examiner.*